United States Patent Office 3,392,218
Patented July 9, 1968

3,392,218
METHOD OF HEATING CARBON MONOXIDE-CONTAINING GASES WITHOUT CARBON DEPOSITION
Theodore Kalina, West Orange, N.J., assignor to Esso Research and Engineering Company, a corporation of Delaware
No Drawing. Filed Mar. 31, 1966, Ser. No. 538,939
8 Claims. (Cl. 263—52)

ABSTRACT OF THE DISCLOSURE

Carbon monoxide-containing gases are heated without carbon deposition through conditions conducive to carbon monoxide reversion. The heating is achieved by combusting a small portion of the gases with oxygen and rapidly mixing the so heated gases to increase the temperature of the gases above the reversion conducive range in a very short time, less than about one second. The invention finds particular utility in the preparation of high temperature reducing gases.

---

This invention relates to heating gases. More particularly, it relates to heating carbon monoxide-containing gas.

The use of gases containing carbon monoxide is common to numerous chemical processes. In many such processes it is necessary to heat the gas from low temperatures, e.g., ambient, to relatively high temperatures, e.g., ranging above about 1200° F. to 1500° F. An example of these processes is the use of carbon monoxide in a reducing gas, e.g., to use in the direct reduction of oxidic ores. Thus, it is known to use carbon monoxide alone or with other reducing gases such as hydrogen, or inert gases, e.g., nitrogen, or both, at temperatures above about 1200° F. to reduce oxidic iron ores to metallic iron. In these ore reduction processes it is desirable to heat the reducing gas by passing it through heat exchanger tubes in a furnace.

Heating carbon monoxide-containing gases to such high temperatures, however, can present serious problems. Thus, when heated through certain ranges of temperature while in contact with catalytic materials such as ferrous metals, carbon monoxide undergoes a reversion reaction to carbon and carbon dioxide:

$$2CO \rightarrow C + CO_2$$

The exact temperature range in which any given gas undergoes reversion depends, inter alia, on the carbon monoxide and carbon dioxide concentrations and system pressure. Generally, however, in the gas concentration and pressure ranges conventionally employed in reducing gas heating facilities, serious regeneration problems are only encountered at temperatures ranging from about 900° F. to about 1500° F., particularly about 900° F. to about 1300° F. At temperatures below about 900° F. reversion kinetics are so slow that carbon deposition is generally nil. At higher temperatures the equilibrium for the reversion reaction shifts so far to the left that reversion is encountered only at very high pressures or carbon monoxide concentrations.

For any given set of conditions, the temperature above which reversion is avoided can be determined from equilibrium considerations. Thus, at equilibrium carbon formation by reversion will be governed according to the equation:

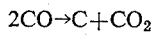

$$\frac{P_{CO_2}}{(P_{CO})^2} = K$$

where $P_{CO_2}$ and $P_{CO}$ are the carbon dioxide and carbon monoxide partial pressures, respectively, and K is the thermodynamic equilibrium constant. In terms of molar concentrations, this reduces to:

$$\frac{Y_{CO_2}}{(Y_{CO})^2 P_T} = K$$

where $Y_{CO_2}$ and $Y_{CO}$ are the respective mole fractions of carbon dioxide and carbon monoxide and $P_T$ is the total system pressure. Thus, reversion will tend to occur only at temperatures for which K is greater than $$\frac{Y_{CO_2}}{(Y_{CO})^2 P_T}$$

Values of K at various temperatures through which reducing gases may be typically heated in a direct iron ore reduction process are shown below.

| T, °F.: | K, ATM$^{-1}$ |
|---|---|
| 1100 | 13.0 |
| 1200 | 2.8 |
| 1300 | 0.83 |
| 1600 | 0.04 |

Within the critical temperature range conducive to reversion for any given gas composition and pressure, however, the carbon monoxide in contact with ferrous metal heat exchanger tubes can liberate and deposit large quantities of free carbon, which can foul or plug the heater or the downstream process equipment.

Even worse, the reversion reaction can liberate a particularly reactive species of carbon which reacts with the metal surfaces of the heat exchanger tubes or other equipment causing metal dusting. This phenomenon, known as catastrophic carburization, results in severe corrosion which can be not only economically undesirable but can also result in unsafe operating conditions, particularly at high pressures.

Another problem caused by carbon monoxide reversion is the formation of carbon dioxide. This can be particularly acute where the carbon monoxide-containing gas is to be used as a reducing gas since the conversion of carbon monoxide to carbon dioxide can drastically lower the reducing potential of the gas. This, inter alia, lowers the overall efficiency of an ore reduction process and lowers the metallic yield or percent metallization of the product.

It is thus the primary objective of this invention to alleviate, and in certain instances eliminate, the reversion of carbon monoxide in heating carbon monoxide-containing gases in contact with materials which catalyze such reversion reaction.

The invention contemplates heating carbon monoxide-containing gas while it is in contact with a catalytic material by reacting a portion of the gas with oxygen. A sufficient portion of gas is reacted with oxygen to generate heat to raise the overall gas temperature, i.e., temperature of the resulting mixture of unreacted gas and gaseous reaction products, through the temperature range conducive to carbon monoxide reversion. The gases are heated through such range in a period of time of less than about 1 second and preferably in a time ranging from about 0.001 to about 0.1 second to minimize or eliminate carbon monoxide reversion.

The portion of carbon monoxide-containing gases to be reacted with oxygen can be optimized or minimized if the gases are first preheated, as desired, to the maximum temperature below the range of temperatures conducive to carbon monoxide reversion.

In a preferred embodiment of this invention, the carbon monoxide-containing gas is preheated to a temperature in the range of from about 600° F. to about 900° F., preferably about 750° F. to about 850° F. before contacting and reacting the portion of gas with oxygen. Such preheating can be accomplished in any conventional manner, e.g., using combustion furnaces or ordinary high temperature steam heat exchangers.

Preferably, about 0.01 to about 0.06 mole of oxygen are reacted per mole of carbon monoxide-containing gas. More preferably, by preheating the reducing gases to about 600–900° F., only about 0.01 to 0.03 mole of oxygen is required per mole of carbon monoxide-containing gas. When the hot gases are to be used as reducing agents, it is particularly desirable to minimize oxygen addition. The oxygen reacts with a portion of the available reducing gases, e.g., hydrogen or carbon monoxide or both, to form water or carbon dioxide or both, this, of course, lowering the reducing potential of the gas. The oxygen is preferably preheated to a temperature ranging from about 1000° F. to about 1500° F.

The precise amount of oxygen to be reacted will depend on the exact gas composition and preheat temperatures. Thus, the mean heat of reaction with oxygen of carbon monoxide-containing gases having substantial quantities of hydrogen will differ from that of essentially pure carbon monoxide. Similarly, the specific heat of the gases will vary with composition. In any case the precise oxygen requirement can be readily determined by heat balance calculations or minimal experimentation. Generally, however, if the carbon monoxide-containing gases are preheated to a temperature ranging from about 750° F. to about 850° F., only about 0.015 to 0.025 mole of oxygen per mole of carbon monoxide-containing gas is required to heat the final mixture through the temperature range conducive to reversion, though a small additional amount may be added to make up for heat losses through insulation, etc.

Pure oxygen can be added to the carbon monoxide-containing gas or, alternatively, an oxygen-containing gas such as air can be used.

It is important that the hot products of the oxidation reaction be rapidly mixed with the remainder of the carbon monoxide-containing gas to heat it through the critical temperature range conducive to reversion in minimal time. While any conventional means for mixing gases can be employed, a preferred method comprises continuously introducing oxygen (or oxygen-containing gases) into a turbulent stream of carbon monoxide-containing gas, igniting and combusting the oxygen with a portion of the gas to produce hot gaseous reaction products, and rapidly mixing such gaseous products in the turbulent stream to yield an overall gas stream at a temperature above the reversion range.

Alternatively, a portion of the carbon monoxide-containing gas can be withdrawn and reacted with oxygen separately and the resulting hot combustion products can then be introduced into the turbulent main gas stream.

Any conventional ignition means for initiating the oxidation reaction can be employed, e.g., an electrical resistance wire, spark plug, etc. A preferred means of ignition is to preheat the oxygen stream to a sufficiently high temperature to cause autoignition upon contact with the carbon monoxide-containing gases. The necessary preheat temperature for the oxygen will, of course, depend on the exact composition of the carbon monoxide-containing gas; however, temperatures ranging above about 1200–1600° F. are generally adequate.

The invention will be better understood by reference to the following specific examples.

Example 1

A reducing gas comprising about 80 mole percent carbon monoxide, 6% carbon dioxide, and the remainder hydrogen is introduced into a 2 inch diameter heat exchanger tube at ambient temperature and atmospheric pressure. The heat exchanger tube is composed of stainless steel and is enclosed in a direct fired combustion furnace. Turbulent gas flow is maintained by feeding the gas stream at a rate of about 20 pounds per second per square foot of cross section. The heat exchanger tube extends about 40 feet beyond the furnace venting the gas through a flare line. Thermocouple readings at the furnace exit indicate an average gas temperature of about 900° F. Preheated air at about 1500° F. is introduced into the hot reducing gas line by means of a small nozzle near the furnace exit adjacent and slightly downstream of the thermocouple. The oxygen feed rate is about 0.025 mole per mole of hydrogen and carbon monoxide. Reducing gas spontaneously ignites and burns with the oxygen in the air at the tip of the nozzle producing reaction products at combustion flame temperatures. A series of thermocouples installed about 2 feet downstream of the nozzle indicate that the mixed gas temperature is approximately 1600° F. The calculated time for the reducing gases to pass from the oxygen nozzle to the down stream thermocouples is approximately 0.02 second. After 4 hours of continuous operation, the heat exchanger and exit gas line are opened. Careful examination, however, reveals no evidence of carbon deposition. Moreover, there is no sign of catastrophic carburization.

In sharp contrast to the foregoing, when the amount of oxygen injected is cut to 0.007 mole per mole of reducing gas, the resulting gas temperature is decreased to about 1100° F. Inspection shows visible evidence of carbon deposition at a high rate. In fact, about 200 milligrams of carbon per square inch of tube surface is found deposited on the tube walls after 4 hours of operation.

Example 2

Reducing gas is used to reduce oxidic iron ores in a fluidized iron ore reduction process. An overall gas mixture introduced into the bottom of the reduction reactor has the following molar composition: $CO_2$—2%; CO—5%; $H_2O$—1%; $N_2$—25%; $H_2$—67%. Iron in particulate fluidizable form is introduced to the top of the reactor and descends through a series of fluidized beds countercurrent to the flow of the ascending reducing gases. In the first bed the ore is reduced from ferric oxide ($Fe_2O_3$) to magnetite or a mixture approximating the composition of magnetite ($Fe_3O_4$). Subsequent lower beds reduce the descending ore to essentially ferrous oxide (FeO) and finally to a mixture of metallic iron and ferrous oxide. The product withdrawn from the bottom fluid bed of the reactor ranges from about 85 to 90% metallic iron.

The ascending reducing gases introduced into the reactor at about 1500° F. are partially oxidized and cooled by the ore, leaving the top reactor bed at a temperature of only about 900° F. and containing approximately 20 to 30 mole percent of carbon dioxide and water.

The exit gas stream is regenerated by cooling the gas to a temperature of about 200° F., to condense out substantially all of the water, followed by scrubbing the gas, to remove most of the carbon dioxide, in a conventional organic amine type scrubber solution.

The regenerated gas is then mixed with makeup gas and heated to a temperature ranging from about 750 to 850° F. by passing it through a conventional combustion heating furnace at 10 atmospheres total pressure and a mass flow velocity of about 30 lbs./sec./ft.² About one-third of the recycle gas is withdrawn from the gas line at the exit of the heating furnace and further heated by combusting oxygen with it in an amount equivalent to 0.02 mole of oxygen per mole of total reducing gas (0.06 mole oxygen per mole of the withdrawn portion of gas). The combustion occurs under turbulent flow conditions, in a pipe lined with refractory to avoid undue wear at high temperatures, at about 10 atmospheres total pressure. The oxygen is preheated to about 800° F. Gas ignition is achieved by means of a glowing hot electrical resistance wire installed adjacent the oxygen inlet which houses a conventional burner designed to operate with less than stoichiometric oxygen rates. Combustion of the reducing gas with the oxygen results in an overall gas temperature, for the withdrawn portion, of about 2500° F. Thermocouple readings indicate that temperature uniformity, i.e. mixing, is complete in 0.04 second. The high temperature gases are then recombined in an unlined steel pipe with the remaining uncombusted two-thirds to provide an overall reducing gas at a temperature of about 1500° F. and about 10 atmospheres pressure. (The time for mixing the two streams of gases is determined to be about 0.08 second.) This gas is then fed to the bottom of the iron ore reducing reactor as previously described.

After about 30 days of continuous operation, the reducing gas heating system is opened for inspection. Essentially no carbon deposits are found in either the heating furnace tubes or in the oxygen combustion or mixing lines downstream.

It is not intended that this invention be limited by the preceding examples which are illustrative. Other obvious modifications will be apparent to those skilled in the art, and the following claims should be so construed.

What is claimed is:

1. A method of heating carbon monoxide-containing gas in contact with a material capable of catalyzing the reversion of carbon monoxide to carbon dioxide and carbon which comprises reacting with oxygen a sufficient portion of the carbon monoxide-containing gas to heat the said gas through the temperature range conducive to carbon monoxide reversion in a period of time in the range of about 0.001 to about 0.1 second.

2. The method of claim 1 wherein said temperature range is from about 900° F. to about 1300° F.

3. The method of claim 2 wherein said carbon monoxide-containing gases are preheated to a temperature in the range of from about 600° F. to about 900° F. prior to reacting with said oxygen.

4. The method of claim 2 wherein said carbon monoxide-containing gases are preheated to a temperature in the range of from about 750° F. to about 850° F. prior to reacting with said oxygen.

5. The method of claim 4 wherein said oxygen is reacted in an amount ranging from about 0.01 to about 0.03 mole per mole of said carbon monoxide-containing gas.

6. The method of claim 5 wherein said oxygen is preheated to a temperature ranging from about 1000° F. to about 1500° F.

7. The method of claim 1 wherein said portion is separated from the carbon monoxide-containing gas, reacted with said oxygen and remixed with said carbon monoxide-containing gas.

8. A method of heating carbon monoxide-containing gas in contact with a material capable of catalyzing the reversion of carbon monoxide to carbon dioxide and carbon which comprises reacting with oxygen a sufficient portion of the carbon monoxide-containing gas to heat the said gas through temperatures conducive to carbon monoxide reversion ranging from about 900° F. to about 1300° F. in a period of time less than about 1 second.

References Cited

UNITED STATES PATENTS

| | | | |
|---|---|---|---|
| 2,183,596 | 12/1939 | Trinks | 158—109 |
| 2,397,485 | 4/1946 | Hemminger | 263—19 XR |
| 3,174,530 | 3/1965 | Meenan | 263—19 XR |

FREDERICK L. MATTESON, JR. *Primary Examiner.*

A. D. HERRMANN, *Assistant Examiner.*